(12) United States Patent
Igarashi

(10) Patent No.: US 11,516,442 B2
(45) Date of Patent: Nov. 29, 2022

(54) DATA TRANSMISSION DEVICE AND DATA TRANSMISSION METHOD

(71) Applicant: TOYOTA JIDOSHA KABUSHIKI KAISHA, Toyota (JP)

(72) Inventor: Ryo Igarashi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/216,894

(22) Filed: Mar. 30, 2021

(65) Prior Publication Data

US 2021/0314533 A1    Oct. 7, 2021

(30) Foreign Application Priority Data

Apr. 6, 2020 (JP) .............................. JP2020-068654

(51) Int. Cl.
- *H04N 7/18* (2006.01)
- *G01C 21/00* (2006.01)
- *G06V 20/56* (2022.01)

(52) U.S. Cl.
CPC ......... *H04N 7/183* (2013.01); *G01C 21/3848* (2020.08); *G06V 20/56* (2022.01)

(58) Field of Classification Search
CPC .............. G01C 21/3848; G01C 21/32; G01C 21/3819; G01C 21/3867; G01C 21/1652; G01C 21/3815; G01C 21/3856; G01C 21/3896; G06N 20/00; G06K 9/6253; G06K 9/6263; G06K 9/6267; G06V 20/46; G06V 10/764; G06V 10/7784; G06V 10/945; G06Q 50/01; G06T 2207/10024

USPC ......................................................... 348/148
See application file for complete search history.

(56) References Cited

U.S. PATENT DOCUMENTS

| | | | |
|---|---|---|---|
| 10,227,211 B2 | 3/2019 | Chen et al. | |
| 2017/0323459 A1* | 11/2017 | Ermilios | ................... G06T 7/80 |
| 2018/0188039 A1* | 7/2018 | Chen | ......................... G06T 7/73 |
| 2020/0003566 A1* | 1/2020 | Hosokawa | ........... G06V 20/584 |
| 2020/0226422 A1* | 7/2020 | Li | ........................ G06K 9/6228 |
| 2020/0396644 A1 | 12/2020 | Matsumoto et al. | |
| 2021/0029674 A1 | 1/2021 | Uchiyama et al. | |

FOREIGN PATENT DOCUMENTS

| | | |
|---|---|---|
| JP | 2011-158446 A | 8/2011 |
| JP | 2018-163438 A | 10/2018 |
| JP | 2019-144501 A | 8/2019 |
| JP | 2019-164840 A | 9/2019 |
| JP | 2019-179993 A | 10/2019 |
| JP | 2020-14158 A | 1/2020 |
| JP | 2020-46971 A | 3/2020 |
| WO | 2019/187562 A1 | 10/2019 |

\* cited by examiner

*Primary Examiner* — Masum Billah
(74) *Attorney, Agent, or Firm* — Oliff PLC

(57) ABSTRACT

The data transmission device includes a processor configured to: acquire data based on a sensor signal from a sensor mounted on a vehicle repeatedly at a predetermined time interval, determine a selection cycle based on a movement speed of the vehicle and selects one or more sets of data from the repeatedly acquired data for each determined selection cycle, and transmit the selected one or more sets of data to an external server.

7 Claims, 8 Drawing Sheets

DATA TRANSMISSION DEVICE AND DATA TRANSMISSION METHOD

CROSS-REFERENCE TO RELATED APPLICATION

This application claims priority to Japanese Patent Application No. 2020-068654 filed on Apr. 6, 2020, and is incorporated herein by reference in its entirety.

FIELD

The present disclosure relates to a data transmission device and a data transmission method for transmitting data to a map generation server.

BACKGROUND

High-precision maps to which the autonomous driving system of a vehicle refers to control autonomous driving of the vehicle is required to accurately represent information about the road environment. Thus, transmitting images representing the surroundings situation of the vehicle acquired by a camera mounted on the vehicle to a map generation server and generating a map using the images received by the map generation server has been proposed.

U.S. patent Ser. No. 10/222,211 (hereinafter referred to as Patent Literature 1) describes a high-precision map system which receives sensor data from travelling vehicles to generate a high-precision map. The high-precision map system described in Patent Literature 1 deletes sensor data acquired from stopped vehicles.

SUMMARY

In order to transmit data from a vehicle to a map generation server, communication is carried out between the vehicle and the map generation server. According to the technology of Patent Literature 1, sensor data is transmitted from the vehicle to the map generation server at regular intervals even when the vehicle is stopped or is travelling at low speeds. In this case, since there is no movement amount of the vehicle or the movement amount is small, the sensor data transmitted from the vehicle to the map generation server does not change or changes only slightly. Thus, the percentage of sensor data transmitted from the vehicle to the map generation server that contributes to map generation in the map generation server decreases. Specifically, the vehicle cannot efficiently transmit sensor data to the map generation server.

The present disclosure aims to provide a data transmission device which can efficiently transmit data to an external server.

The data transmission device according to the present disclosure comprises a data acquisition unit which acquires data based on a sensor signal from a sensor mounted on a vehicle repeatedly at a predetermined time interval, a data selection unit which determines a selection cycle based on a movement speed of the vehicle and selects one or more sets of data from the repeatedly acquired data for each determined selection cycle, and a data transmission unit which transmits the selected one or more sets of data to an external server.

In the data transmission device according to the present disclosure, it is preferable that the sensor be a camera which outputs images in which surroundings of the vehicle are represented, and the data selection unit be configured to determine the selection cycle based on a movement amount of the vehicle, which is moving at the movement speed, in the time interval and a length of the vehicle in a direction of travel in the images so that the selected images overlap each other in the direction of travel of the vehicle.

In the data transmission device according to the present disclosure, it is preferable that the data selection unit evaluate the quality of the respective data included in the selection cycle and select sets of data included in the selection cycle sequentially in order from highest quality.

In the data transmission device according to the present disclosure, it is preferable that the sensor be a camera which outputs images in which surroundings of the vehicle are represented, and the data acquisition unit be configured to acquire feature data which indicates features identified by a classifier which identifies predetermined features from the images.

In the data transmission device according to the present disclosure, it is preferable that the data acquisition unit acquire a confidence indicating a certainty of identification of the features from the images as well from the classifier, and the data selection unit select the feature data included in the selection cycle sequentially in order from the highest confidence.

In the data transmission device according to the present disclosure, it is preferable that the data selection unit temporarily save the selected data in a memory, and the data transmission unit transmit the selected data temporarily stored in the memory to the external server for each selection cycle.

In the data transmission device according to the present disclosure, it is preferable that the data acquisition unit temporarily store the acquired data based on the sensor signal in a memory, and the data selection unit select one or more sets of data from the acquired data temporarily stored in the memory.

In the data transmission device according to the present disclosure, it is preferable that the data transmission unit transmit the selected data to the external server, which generates a map using received data.

A data transmission method according to the present disclosure comprises the steps of acquiring data based on a sensor signal from a sensor mounted on a vehicle repeatedly at a predetermined time interval, determining a selection cycle based on a movement speed of the vehicle, selecting one or more sets of data from the repeatedly acquired data for each determined selection cycle, and transmitting the selected one or more sets of data to an external server.

According to the data transmission device according to the present disclosure, data can efficiently be transmitted to an external server.

BRIEF DESCRIPTION OF DRAWINGS

Other features and advantages of the present invention will be apparent from the ensuing description, taken in conjunction with the accompanying drawings, in which.

DESCRIPTION OF EMBODIMENTS

The data transmission device will be described in detail below with reference to the drawings. The data transmission device acquires data based on a sensor signal from a sensor mounted on a vehicle repeatedly at a predetermined time interval. Next, the data transmission device determines a selection cycle based on a movement speed of the vehicle, and selects one or more sets of data from the repeatedly acquired data for each determined selection cycle. The data transmission device then transmits the selected data to an external server.

Figure 1:
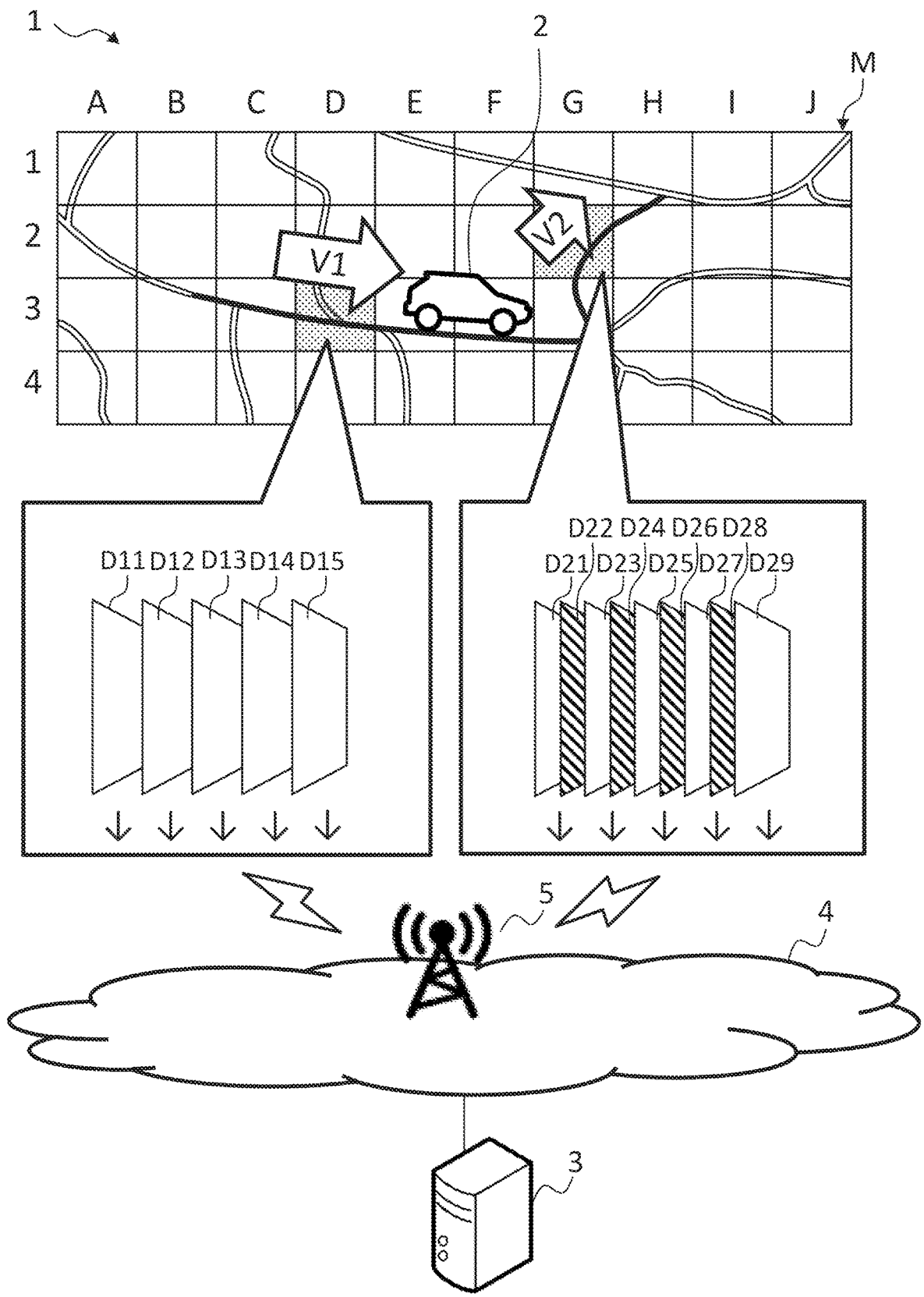
FIG. 1 is a view detailing an overview of a map generation system comprising a data transmission device.

FIG. 1 is a view detailing an overview of a map generation system comprising the data transmission device. In the present embodiment, a map generation system 1 comprises a vehicle 2, which comprises a data transmission device, and a map generation server 3. The vehicle 2 connects to the map generation server 3 via a wireless base station 5 and a communication network 4 by, for example, accessing the wireless base station 5 which is connected to the communication network 4 to which the map generation server 3 is connected via a gateway or the like. The map generation server 3 is an example of an external server and generates a map by using received data.

The map generation system 1 manages a map M by dividing it into meshes of a predetermined size. While the vehicle 2 travels on mesh D-3 of the map M at speed V1, data D11 to D15 based on the sensor signal from the sensor mounted on the vehicle 2 is acquired at a predetermined time interval (for example, 1/10 second). All of the acquired data D11 to D15 is selected based on the speed V1 in the mesh D-3. The selected data D11 to D15 is then transmitted to the map generation server 3 via the wireless base station 5 and the communication network 4.

Furthermore, while the vehicle 2 travels on mesh G-2 of the map M at speed V2, data D21 to D29 acquired by the sensor mounted on the vehicle 2 is acquired at the predetermined time interval. Speed V2 is a speed which is lower than speed V1. Based on speed V2 in mesh G-2, data D21, D23, D25, D27, and D29 is selected from the acquired data D21 to D29. Further, the selected data D21, D23, D25, D27, and D29 is transmitted to the map generation server 3 via the wireless base station 5 and the communication network 4.

In the present embodiment, the data based on the sensor signal from the sensor mounted on the vehicle 2 is an image, which is captured at a predetermined time interval by a camera mounted on the vehicle 2, in which the front region of the vehicle is shown. Since the vehicle 2 travels at a comparatively low speed in mesh G-2, there is overlap between adjacent images. By selecting the data to be transmitted to the map generation server so that the selected data overlap in the direction of travel of the vehicle, the data transmission device can efficiently transmit the data to the map generation server.

Figure 2:
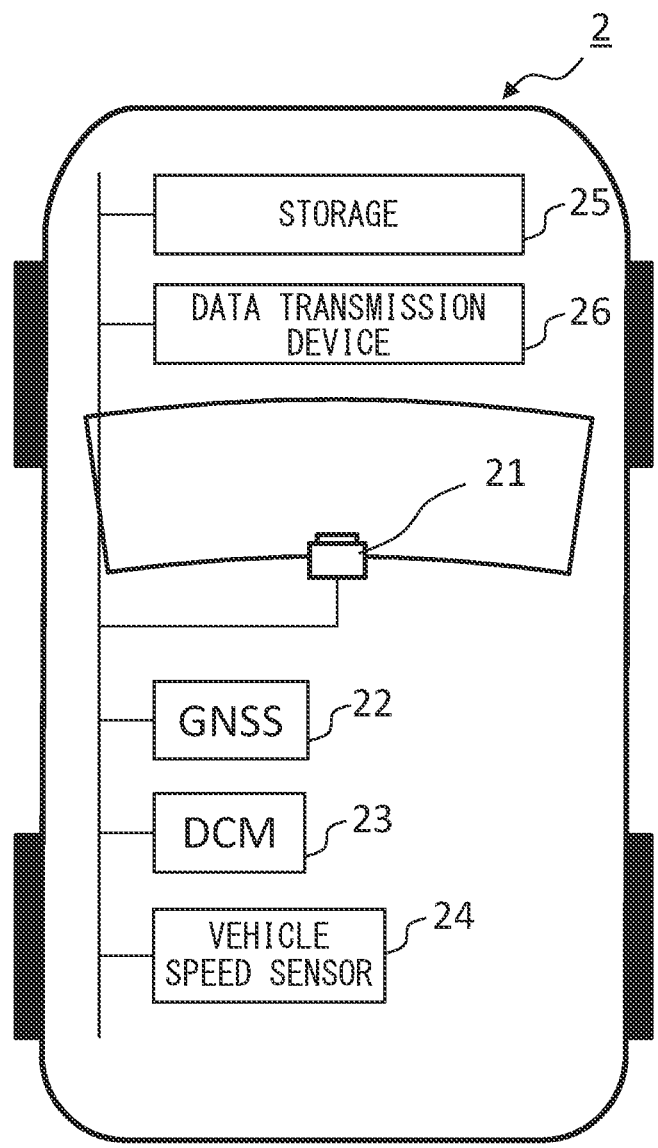
FIG. 2 is a schematic structural view of a vehicle comprising a data transmission device.

FIG. 2 is a schematic structural view of the vehicle 2 comprising a data transmission device. The vehicle 2 comprises a camera 21, a GNSS receiver 22, a DCM (data communication module) 23, a vehicle speed sensor 24, a storage device 25, and a data transmission device 26. The camera 21, GNSS receiver 22, DCM 23, vehicle speed sensor 24, storage device 25, and data transmission device 26 are communicably connected via an in-vehicle network compliant with standards such as controller area network.

The camera 21 is an example of a sensor, and has a two-dimensional detector composed of an array of photoelectric conversion elements which are sensitive to visible light, such as a CCD or C-MOS, and an optical imaging system which forms an image of the area to be imaged on the two-dimensional detector. The camera 21 is attached in the passenger compartment of the vehicle 2 so as to face the front of the vehicle 2. The camera 21 photographs the front area of vehicle 2 at predetermined capture cycles (for example, 1/30 second to 1/10 second), and generates images in which the front area is captured. The images obtained by the camera 21 may be color images or monochrome images. The vehicle 2 may be provided with a plurality of cameras, and the capture directions and focal lengths of the plurality of cameras may be different from each other.

Each time an image is generated, the camera 21 outputs the generated image to the data transmission device 26 via the in-vehicle network.

The GNSS receiver 22 receives a GNSS (Global Navigation Satellite System) signal from a GNSS satellite in predetermined cycles, and measures the position of the vehicle 2 itself based on the received GNSS signal. The GNSS receiver 22 outputs a positioning signal representing the positioning results of the position of the vehicle 2 itself based on the GNSS signal in predetermined cycles to the data transmission device 26 via the in-vehicle network.

The DCM 23 is a device which executes wireless communication processing conforming to a predetermined wireless communication standard, and connects to the map generation server 3 via the wireless base station 5 and the communication network 4 by, for example, accessing the wireless base station 5. The DCM 23 receives a downlink wireless signal from the wireless base station 5, and passes a data transmission request signal representing the data transmission request included in the wireless signal from the map generation server 3 to the data transmission device 26. Furthermore, the DCM 23 includes the data received from the data transmission device 26 in the uplink wireless signal and transmits the wireless signal to the wireless base station 5, thereby transmitting the data to the map generation server 3.

The vehicle speed sensor 24 measures the current movement speed of the vehicle 2 based on the rotational speed of the drive shaft. The vehicle speed sensor 24 outputs a vehicle speed signal indicating the current movement speed in predetermined cycles to the data transmission device 26 via the in-vehicle network. The vehicle speed sensor 24 may connect to the in-vehicle network via a predetermined microprocessor.

The storage device 25 is an example of a memory, and includes, for example, a hard disk device or non-volatile semiconductor memory. The storage device 25 temporarily stores image data obtained from the camera 21. The storage device reads the image data in accordance with a request to read image data from the data transmission device 26, and passes the read image data to the data transmission device 26 via the in-vehicle network. Furthermore, the storage device 25 may store a vehicle identifier for identifying the vehicle 2.

The data transmission device 26 is an electronic controller which executes calculation based on input signals and outputs calculation results. The data transmission device 26 may be mounted on the vehicle 2 as a drive recorder which stores, in the storage device 25, images representing the surroundings of the vehicle 2 generated by the camera 21 while the vehicle 2 is traveling.

Figure 3:
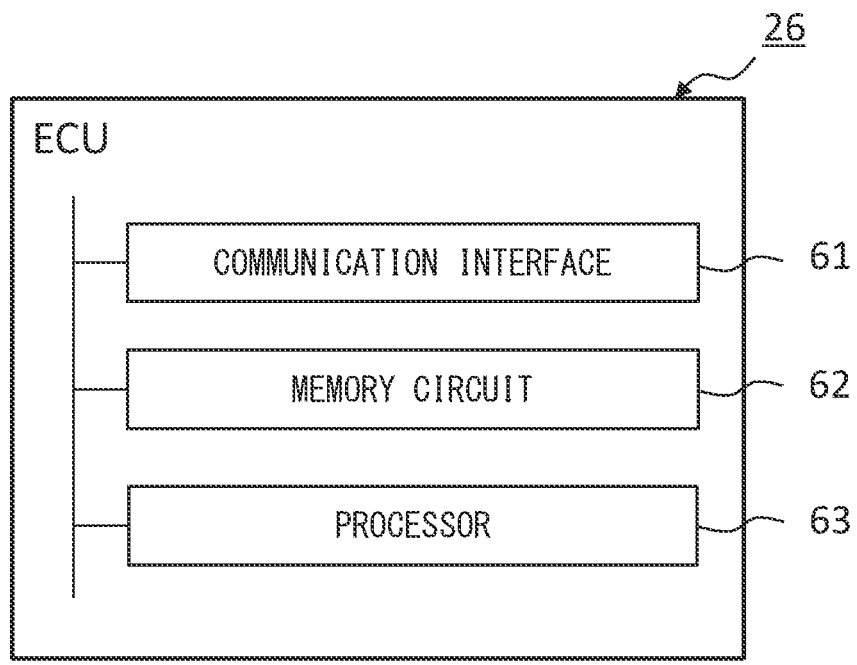
FIG. 3 is a schematic hardware view of a data transmission device.

FIG. 3 is a schematic hardware view of the data transmission device 26. The data transmission device 26 selects data based on the images obtained from the camera 21 based on the speed of the vehicle and transmits the selected data to the map generation server 3. To this end, the data transmission device 26 comprises a communication interface 61, a memory circuit 62, and a processor 63.

The communication interface 61 is an example of a communication unit, and has a communication interface circuit for connecting the data transmission device 26 to the in-vehicle network. The communication interface 61 supplies received data to the processor 63. Furthermore, the communication interface 61 outputs data supplied from the processor 63 to the outside.

The memory circuit 62 has volatile semiconductor memory and non-volatile semiconductor memory. The memory circuit 62 stores various data used for processing by the processor 63, for example, the time interval at which data is acquired, and a distance range represented in the data. Furthermore, the memory circuit 62 stores various application programs such as a data transmission program for executing data transmission control.

The processor 33 is an example of a control unit, and has one or more processors and the peripheral circuits therefor. The processor 33 may further have other calculation circuits such as logical operation units, numerical operation units, or graphics processing units.

Figure 4:
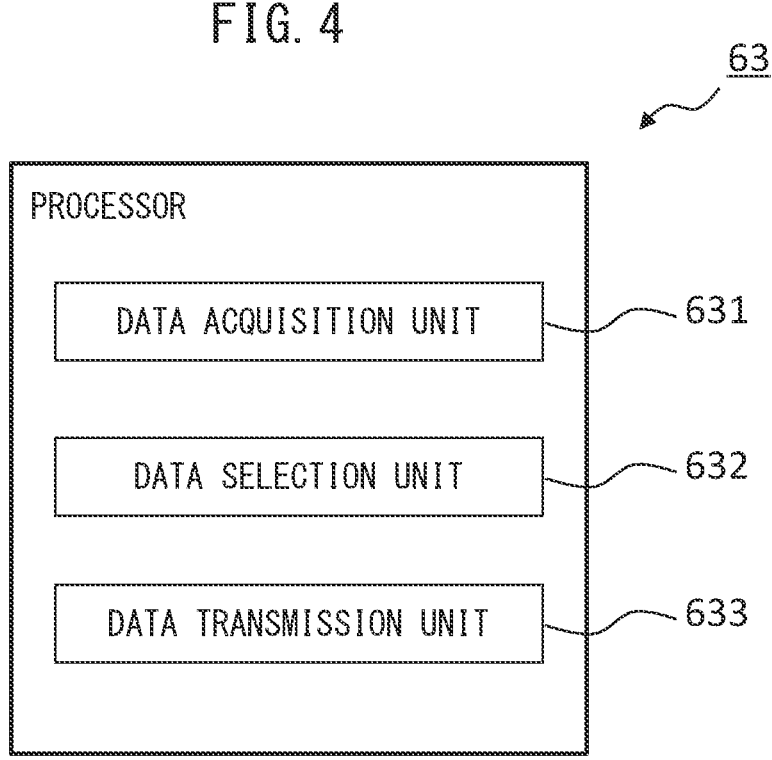
FIG. 4 is a functional block diagram of a processor included in a data transmission device.

FIG. 4 is a functional block diagram of the processor 63 included in the data transmission device 26.

The processor 63 of the data transmission device 26 has, as functional blocks, a data acquisition unit 631, a data selection unit 632, and a data transmission unit 633. The various units included in the processor 63 are functional modules which are implemented by programs executed by the processor 63. Alternatively, the various units included in the processor 63 may be implemented in the data transmission device 26 as independent integrated circuits, microprocessors, or firmware.

The data acquisition unit 631 acquires images from the camera 21 via the communication interface 631 each time the camera 21 mounted on the vehicle 2 generates an image (at intervals of, for example, 1/10 second). In other words, the data acquisition unit 631 acquires images from the camera 21 repeatedly at a predetermined time interval (e.g., 1/10 second).

Figure 5:
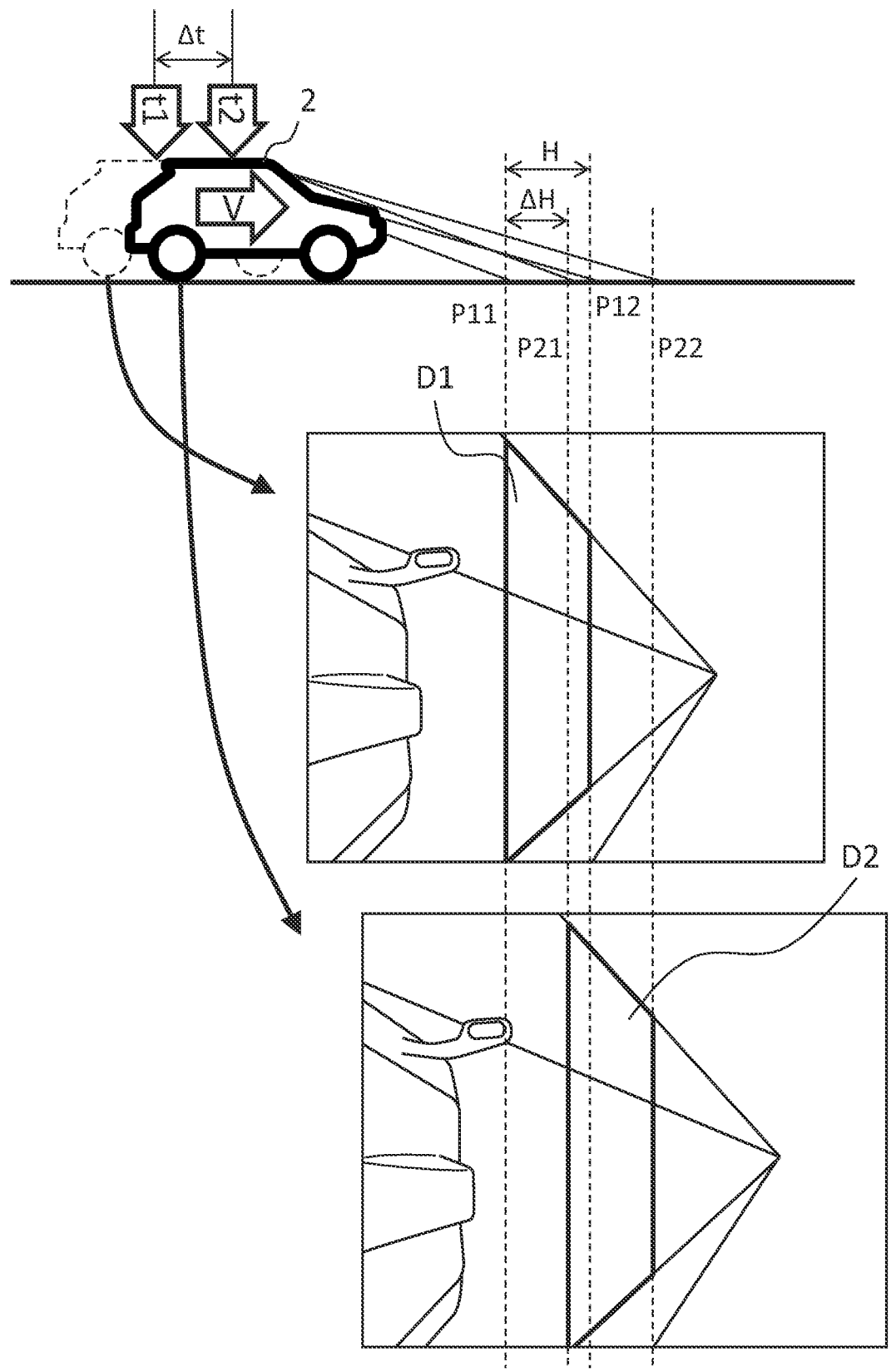
FIG. 5 is a view detailing an example of image acquisition.

FIG. 5 is a view detailing an example of image acquisition. The data acquisition unit 631 acquires data D1 based on the image output by the camera 21 of the vehicle 2, which is moving at the movement speed V, at time t1. The data D1 is image data obtained by cutting out a part of the image output by the camera 21, and represents the situation between positions P11 and P12 on the road in front of the vehicle 2. Furthermore, the data acquisition unit 631 acquires data D2 based on the image output by the camera 21 of the vehicle 2 at time t2 after the time interval Δt has elapsed from time t1. The data D2 is image data obtained by cutting out a part of the image output by the camera 21, and represents the situation between positions P21 and P22 on the road in front of the vehicle 2.

On the road represented by the data D1, position P11 closest to the vehicle 2 and position P12 farthest from vehicle 2 are separated by a distance interval H (for example, 4 m). Specifically, the distance range represented by data D1 is H. Furthermore, position P11 closest to the vehicle 2 on the road represented by the data D1 and position P21 closest to vehicle 2 on the road represented by the data D2 are separated by an interval ΔH. The interval ΔH corresponds to the movement amount at the time interval Δt between time t1 and time t2. Thus, the ΔH can be obtained by multiplying the movement speed V of the vehicle by the time interval Δt.

The data selection unit 632 determines the selection cycle based on the movement speed of the vehicle 2 measured by the vehicle speed sensor 24, and selects one or more sets of data from the repeatedly acquired data for each determined selection cycle.

Figure 6A:
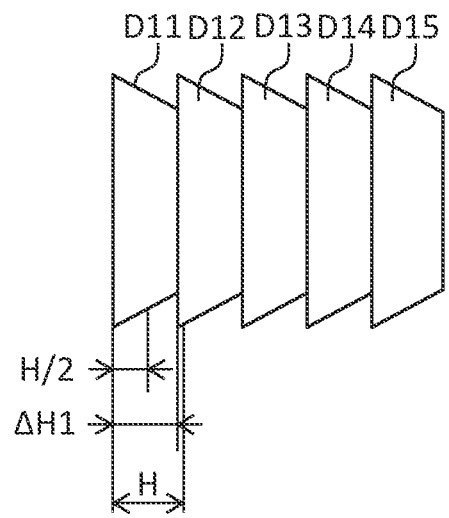
FIG. 6A is a view detailing a first example of selection cycle determination.
Figure 6B:
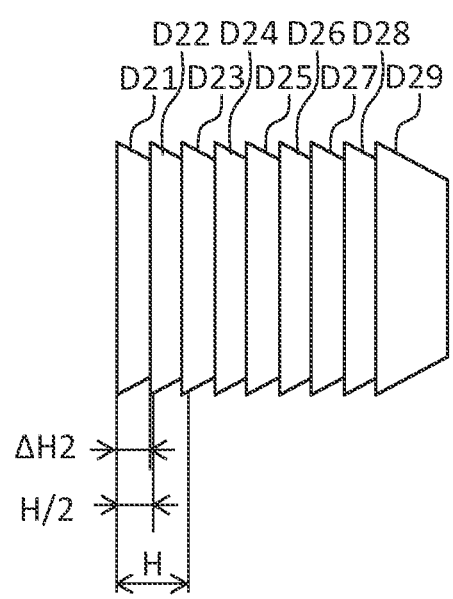
FIG. 6B is a view detailing a second example of selection cycle determination.

FIG. 6A-6B is a view detailing examples of selection cycle determination.

In FIG. 6A, the data D11 to D15 based on the image output by the camera 21 of the vehicle 2 when moving at a comparatively high movement speed (e.g., 90 km/h) are arranged so as to correspond to the positions represented by the data. The height of the data D11 to D15 (the distance range represented in the data) is H.

The position of data D11 and the position of data D12 are shifted by interval ΔH1. As a result, the data D11 and the data D12 overlap by (H−ΔH1). In other words, the height of the portion that does not overlap with adjacent preceding and subsequent data is expressed as H−2(H−ΔH1)=2ΔH1−H. When the interval between the time when the data D11 is acquired and the time when the data D12 is acquired is 1/10 second and the movement speed of the vehicle 2 is 90 km/h, ΔH1 is 2.5 m. Since ΔH1 is greater than H/2, this height is positive. Therefore, each of data D11 to D15 has a portion which does not overlap with the preceding and subsequent data. In this case, in order to select data so that the data after selection overlap with each other in the direction of travel of the vehicle, the selection cycle is set to 1 and all of the data is selected.

In FIG. 6B, data D21 to D29 based on images output by the camera 21 of the vehicle 2 when travelling at a comparatively low movement speed (e.g., 36 km/h) are arranged so as to correspond to the positions represented by the data. Like FIG. 6A, the distance range represented in data D21 to D29 is H.

The position of data D21 and the position of data D22 are shifted by interval ΔH2. When the interval between the time at which data D21 is acquired and the time at which data D22 is acquired is 1/10 second and the movement speed of the vehicle 2 is 36 km/r, ΔH2 is 1 m. Since ΔH2 is less than H/2, the height 2ΔH2−H of the portion which does not overlap with the preceding and subsequent data is negative. Therefore, each of data D21 to D29 has a portion which overlaps the preceding and subsequent data. In this case, the selection cycle is set to two and the data selection unit 632 selects at least one (e.g., every other) set of data from two consecutive sets of data, whereby the selected data overlap each other in the direction of travel of the vehicle and there are no interruptions.

To generalize the foregoing, when data representing the state of the range of the distance interval H around the vehicle 2 moving at movement speed V is acquired every time interval Δt, if n for which the following formula (1) holds is defined as the selection cycle, the selected data overlap each other in the direction of travel of the vehicle. Hereinafter, n is also referred to as the "selection cycle", and data from a certain set of data to the nth set of data is also referred to as the "data included in the selection cycle."

$$H/(n+1)\Delta t < V \leq H/n\Delta t (n \text{ is a natural number}) \quad \text{formula (1)}$$

The data selection unit 632 reads the time interval Δt at which data is acquired and the distance interval H of the range represented by the data from the memory circuit 62 and substitutes them into formula (1). Furthermore, the data selection unit 632 substitutes the movement speed V of the vehicle 2 received from the vehicle speed sensor 24 into formula (1). The data selection unit 632 increments n by 1 in order from 1 until formula (1) becomes true. The data selection unit 632 then selects at least one set of data from n consecutive sets of data, and sets n for which formula (1) holds as the selection cycle.

The data selection unit 632 may read the speed range corresponding to each of the different ns obtained using the time interval Δt and the distance interval H from the memory circuit 62, and selects data using n corresponding to the speed range to which the received movement speed V belongs.

The data selection unit 632 selects (for example, the first) set of data from the data included in the selection cycle based on the order of arrangement. Furthermore, the data selection unit 632 may determine the data to be selected from the data included in the selection cycle based on predetermined criteria. For example, the data selection unit 632 evaluates the quality of each set of data, which is the image data included in the selection cycle, and selects in descending order of quality.

The data selection unit 632 inputs a partial image cut out from the data to a predetermined size into a classifier trained in advance to determine the quality of the partial image included in the image, whereby a score corresponding to the quality of the partial image (for example, pass: 1, fail: 0) is acquired. The data selection unit 632 adds the scores of all of the partial images contained in a certain set of data to obtain the score of the set of data. The data selection unit 632 then selects in order from the image with the highest score in the data included in the selection cycle.

The classifier can be, for example, a convolutional neural network (CNN) having a plurality of convolutional layers connected in series from the input side to the output side, a fully connected layer, and an output layer. The convolution layers execute a convolution operation and output a feature map. The fully connected layer joins all the features contained in the feature map output by the convolution layer. The output layer inputs the output of the fully connected layer to an activation function and outputs the output value. A sigmoid function or a step function can be used as the activation function. By inputting the partial image to which the score is given in advance into the CNN as teacher data and performing learning, the CNN operates as a classifier which detects the image including the features.

The data transmission unit 633 transmits the data selected by the data selection unit 632 to the map generation server 3 via the communication interface 61, the in-vehicle network, the DCM 23, the wireless base station 5, and the communication network 4.

Furthermore, the data transmission unit 633 adds a positioning signal received from the GNSS receiver 22 and the vehicle identifier stored in the storage device 25 to the selected data and sends them to the map generation server 3.

Figure 7:
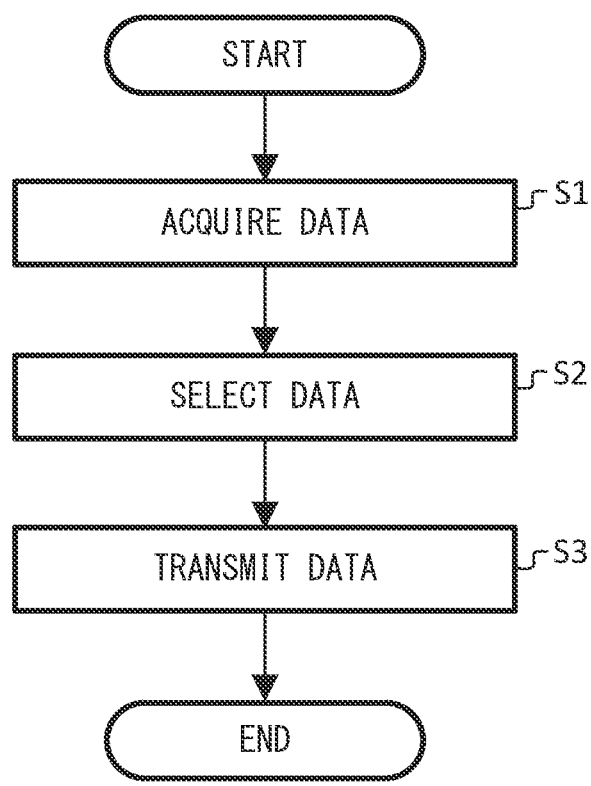
FIG. 7 is an operation flowchart of data transmission processing.

FIG. 7 is an operation flowchart of the data transmission process. The processor 63 of the data transmission device 26 repeatedly executes the data transmission process at predetermined cycles according to the following operation flowchart in accordance with the data transmission request signal received from the map generation server 3.

The data acquisition unit 631 of the processor 63 acquires data based on sensor signals from the camera 21 mounted on the vehicle 2 repeatedly at predetermined time intervals (step S1). The data selection unit 632 selects one or more sets of data from the repeatedly acquired data based on the movement speed of the vehicle 2 (step S2). The details of the data selection process executed in step S2 will be described later. Further, the data transmission unit 633 transmits the selected data to the map generation server, which generates a map using the received data (step S3). Thereafter, the data transmission process ends.

Figure 8:
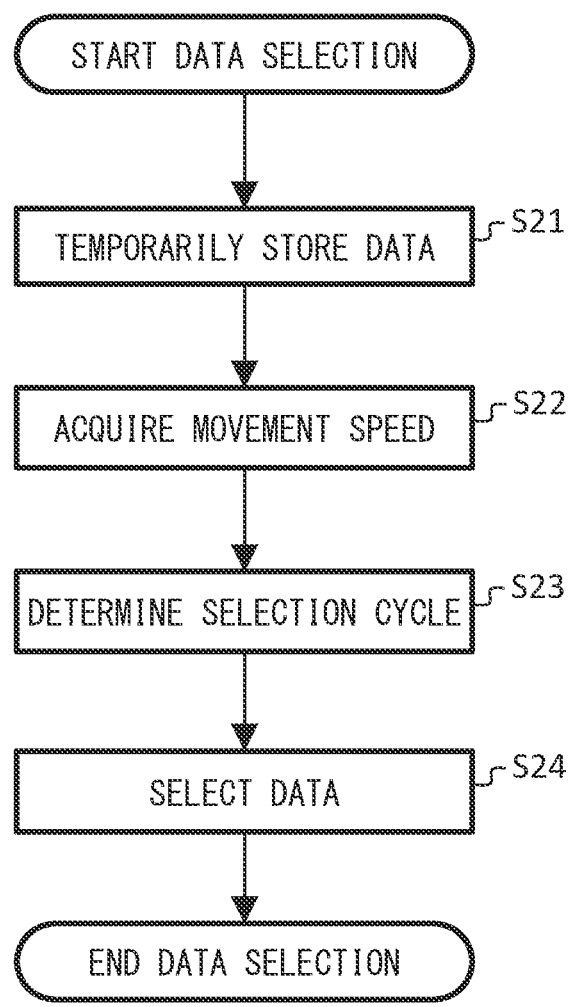
FIG. 8 is an operation flowchart of data selection processing.

FIG. 8 is an operation flowchart of the data selection process. The data selection unit 632 of the processor 63 executes the data selection process according to the following operation flowchart each time step S2 is called in the data transmission process.

When the data selection process starts, the data selection unit 632 temporarily stores the repeatedly acquired data by the data acquisition unit 631 in the storage device 25 (step S21). Further, the data selection unit 632 receives the vehicle speed signal from the vehicle speed sensor 24 and acquires the movement speed of the vehicle 2 represented by the vehicle speed signal (step S22).

Next, the data selection unit 632 determines the selection cycle from the temporarily stored data based on the movement speed of the vehicle (step S23). Specifically, the data selection unit 632 determines n for which the above formula (1) holds as the selection cycle.

The data selection unit 632 selects data to be transmitted to the map generation server 3 from the data included in the predetermined selection cycle from among the temporarily stored data (step S24), and the data selection process ends.

Figure 9:
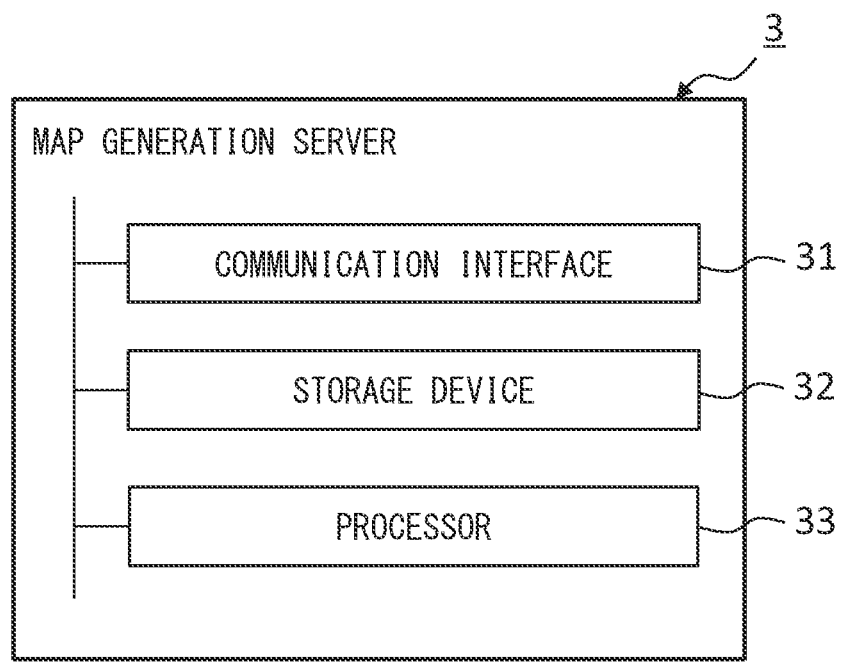
FIG. 9 is a hardware structure view of a map generation server.

FIG. 9 is a hardware configuration view of the map generation server 3. The map generation server 3 receives data from the vehicle 2 via the communication network 4, and generates a map using the received data. To this end, the map generation server 3 comprises a communication interface 31, a storage device 32, and a processor 33.

The communication interface 31 has an interface circuit for connecting the map generation server 3 to the communication network. The communication interface 31 is configured so as to be capable of communicating with the vehicle 2 via the communication network 4 and the wireless base station 5. In other words, the communication interface 31 transmits a data transmission request signal received from the processor 33 to the vehicle 2 via the communication network 4 and the wireless base station 5. Furthermore, the communication interface 31 passes image data or feature data received from the vehicle 2 via the wireless base station 5 and the communication network 4 to the processor 33.

The storage device 32 has, for example, a hard disk device or optical storage medium and an access device therefor. The storage device 32 stores the image data or feature data received from the vehicle 2. Furthermore, the storage device 32 stores map data generated by the processor 33. Further, the storage device 32 may store a computer program, executed by the processor 33, for executing a map generation process.

The processor 33 has one or a plurality of CPUs (Central Processing Units) and peripheral circuits therefor. The processor 33 may further have other calculation units such as logical operation units or numerical operation units. The processor 33 executes the map generation process.

In the map generation process, the processor 33 first transmits a data transmission request signal for requesting the transmission of data to the vehicle 2. The processor 33 may identify a section (mesh) for which data from the vehicle 2 is necessary, and may transmit the data transmission request signal for requesting the transmission of data of the identified section to the vehicle 2. Sections are designated by, for example, a range of predetermined latitudes and longitudes.

The processor 33 identifies a plurality of sets of data representing the status of a predetermined position range received from the vehicle 2 based on positioning information and the vehicle identifier added to the data received from the vehicle 2.

The processor 33 detects an area that overlaps with other data for each of the identified plurality of sets of data, and generates a map by combining the data so that the overlapping areas overlap.

As a result of the data transmission device 26 executing the data transmission process as described above, the data transmission device 26 can efficiently transmit data to the map generation server.

According to a modified example, the camera 21 may be a LIDAR (Light Detection and Ranging) sensor which acquires distance images of the surroundings of the vehicle 2. The distance images are images in which each pixel has a value corresponding to the distance to the object represented by the pixel.

Furthermore, according to another modified example, the data transmitted by the data transmission device to the map generation server may be feature data representing features which are identified based on the image generated by the camera 21 and which represent features present in the surroundings of the vehicle.

In the present modified example, the data acquisition unit 631 acquires feature data by inputting the image obtained from the camera 21 into a classifier trained in advance so as to detect the features represented in the image. The feature is, for example, a lane marking on the road surface, a road marking, or a sign displayed on the road. Note that a plurality of sets of feature data may be detected from one image. In this case, the data acquisition unit 631 may handle a plurality of sets of feature data detected from one image as one data group.

The classifier is, for example, a CNN. By inputting the image including the feature and the position information of the area including the feature into the CNN in advance as the teacher data and performing learning, the CNN operates as a classifier for detecting the area including the feature from the image.

The data selection unit 632 determines the selection cycle based on the movement speed of the vehicle 2, selects one or more images for each determined selection cycle, and selects feature data extracted from the selected images as data to be transmitted.

In the present modified example, the data acquisition unit 631 may acquire a confidence rate indicating the certainty of the identification of features from the image together with the feature data from the identification device. Further, the data selection unit 632 may select feature data included in the selection cycle sequentially in order from highest confidence.

In another modified example, the data selection unit 632 may first execute data selection and then temporarily store the selected data. In other words, the data selection unit 632 may execute the temporary storage of data (step S21) of the data selection process operation flowchart shown in FIG. 8 after data selection (step S24).

In this modified example, the temporarily stored data is transmitted to the map generation server 3 for each selection cycle by the data transmission unit 633. Thus, the capacity of the storage device 25 used for the temporary storage of data can be reduced.

A person skilled in the art would understand that various changes, replacements, and modifications can be made without deviating from spirit and scope of the present disclosure.

The invention claimed is:

1. A data transmission device, comprising a processor configured to:
   acquire data based on a sensor signal from a camera mounted on a vehicle and which outputs images in which surroundings of the vehicle are represented, repeatedly at a predetermined time interval;
   acquire feature data which indicates features identified by a classifier which identifies predetermined features from the images;
   acquire a confidence indicating a certainty of identification of the features from the images from the classifier;
   determine a selection cycle based on a movement speed of the vehicle and select one or more sets of data from the repeatedly acquired data for each determined selection cycle, the selection cycle being determined so that a movement amount of the vehicle, which is moving at the movement speed, in the time interval of the data selected in accordance with the selection cycle exceeds half of a height of the images;
   select the feature data included in the selection cycle sequentially in order from the highest confidence; and
   transmit the selected one or more sets of data to an external server.

2. The data transmission device according to claim 1, wherein the processor is further configured to evaluate quality of the respective data included in the selection cycle and select sets of data included in the selection cycle sequentially in order from highest quality.

3. The data transmission device according to claim 1, wherein the processor is further configured to:
   temporarily save the selected data in a memory, and
   transmit the selected data temporarily stored in the memory to the external server for each selection cycle.

4. The data transmission device according to claim 1, wherein the processor is further configured to:
   temporarily store the acquired data based on the sensor signal in a memory, and
   select one or more sets of data from the acquired data temporarily stored in the memory.

5. The data transmission device according to claim 1, wherein the processor is further configured to transmit the selected data to the external server, which generates a map using received data.

6. The data transmission device according to claim 1, wherein the classifier is a convolutional neural network.

7. A data transmission method, comprising:
   acquiring data based on a sensor signal from a camera mounted on a vehicle and which outputs images in which surroundings of the vehicle are represented, repeatedly at a predetermined time interval;
   acquiring feature data which indicates features identified by a classifier which identifies predetermined features from the images;
   acquiring a confidence indicating a certainty of identification of the features from the images from the classifier;
   determining a selection cycle based on a movement speed of the vehicle and selecting one or more sets of data from the repeatedly acquired data for each determined selection cycle, the selection cycle being determined so that a movement amount of the vehicle, which is moving at the movement speed, in the time interval of the data selected in accordance with the selection cycle exceeds half of a height of the images;

selecting the feature data included in the selection cycle sequentially in order from the highest confidence; and transmitting the selected one or more sets of data to an external server.

* * * * *